United States Patent [19]

Kawashima

[11] Patent Number: 5,417,748

[45] Date of Patent: May 23, 1995

[54] WRITING INSTRUMENT

[76] Inventor: Kiyoharu Kawashima, 5-7, Esaka-cho 5-chome, Suita-shi, Osaka-fu, Japan

[21] Appl. No.: 179,720

[22] Filed: Jan. 11, 1994

[30] Foreign Application Priority Data

Feb. 12, 1993 [JP] Japan .................... 5-047345

[51] Int. Cl.6 .................................. C09D 11/16
[52] U.S. Cl. ...................... 106/27 A; 106/19 A; 106/210; 106/22 B
[58] Field of Search ............. 106/19 A, 21 A, 21 D, 106/22 B; 401/198

[56] References Cited

U.S. PATENT DOCUMENTS

| 4,097,288 | 6/1978 | Lawton | 106/21 E |
| 4,557,618 | 12/1985 | Iwata et al. | 106/20 A |
| 4,907,903 | 3/1990 | Kawashima | 106/21 R |
| 5,057,154 | 10/1991 | Kusakata et al. | 106/21 A |

FOREIGN PATENT DOCUMENTS 0438608 7/1991 European Pat. Off. .

OTHER PUBLICATIONS

WPI 90-020141, Derwent Publications Ltd, GB; & JP-A-1301366 (Fuji Photo Film) May 12, 1989 *Thermal Record Material Comprise Substrate Record Layer Contain Zeolite Water.*

Primary Examiner—Helene Klemanski
Attorney, Agent, or Firm—Birch, Stewart, Kolasch & Birch

[57] ABSTRACT

A writing instrument contains, in its own container, a color ink agent mixing at least one electron donative coloring compound and one electron acceptive developing compound. The electron donative coloring compound is selected from a group composed of crystal violet lactone; malachite green lactone; 1,3-dimethyl-6-diethylaminofluoran 6-diethylamino-benzo[α]-fluoran; 3-cyclohexyl methylamino-6-methyl-7-anilinofluoran; benzoyl leucomethylene blue; ethyl leucomethylene blue; methoxybenzoyl leucomethylene blue; 2-(phenylimino ethanedilidene)-3,3-trimethyl-indoline; 1,3,3-trimethyl-indolino-7'-chloro-β-naphthospiropyran; di-β-naphthospiropyran; N-acetylauramlne; N-phenylauramine; and rhodamine B lactam. The electron acceptive developing compound is selected from a group composed of zinc salicylate and bisphenol A.

1 Claim, 1 Drawing Sheet

WRITING INSTRUMENT

BACKGROUND OF THE INVENTION

The present invention relates to a writing instrument capable of instantly discoloring written letters and the like by applying water thereto, enabling easy erasure and correction of letters as well as restoration of such letters that has been once erased.

FIELD OF THE INVENTION

As writing instruments, pencils, fountain pens, ballpoint pens, water-based and oil-based felt-tipped pens and the like are widely known in prior art. Such prints as graphics and letters written with the above mentioned instrument must have been erased or corrected by using, for example, an eraser with a pencil and an ink erasing fluid with a fountain pen for a bleaching effect. In the case of a felt-tipped pen or the like, although a print can be erased, if it is written on a non-permeable surface such as glass and plastic, by wiping it off with a sheet of paper or cloth containing a solvent for solving the ink, if it is written on such permeable surface as paper and cloth, because the ink penetrates into the surface, it is difficult to erase the print even by using such solvent. As a result, the use of a white correction fluid or white correction tape, for example, is accordingly required in such case for covering and hiding the written print.

As mentioned above, in the conventional writing instrument, it is an inconvenience that a special member such as an eraser, an ink erasing fluid and a white fluid or tape must be employed for erasure and correction of a written print. Thus, introduction of a writing instrument capable of allowing easier erasure and correction has been strongly demanded in these days.

Also, an ink with powdery pigments suspended and mixed in an alcohol is used in a so-called whiteboard marker for use with a whiteboard. Then, after a written print is dried, only the powdery pigments are adhered to the whiteboard, and easily wiped off with such cloth as a whiteboard eraser. However, such erasure is allowed only on a non-permeable surface such as whiteboard. And such problems are presented that the powdery pigments are dispersed and contaminate the vicinity, when they are wiped off. Further, blur in writing may be caused because a high-speed writing cannot be followed due to such characteristic of the ink that the efficiency of sucking the pigment is inferior.

Thus, in consideration of such circumstances, the inventor repeatedly studied various dyes, pigments and the like. As a result, it was found that certain electron donative coloring compounds known as dyes reacted to a specific electron acceptlye developing compound that is zinc salicylate or bisphenol A, and was developed from colorless to colored state; and the effect of developing compound was lost by application of water after the coloration, returned to the colorless state from the colored state, and the achromatic/chromatic changes could be effected repeatedly. Then, it was found that a novel writing instrument capable of fulfilling the conventional demand could be introduced by using a color ink agent with such specific coloring compound mixed with developing compound.

It is hence a primary object of the invention to provide a writing instrument capable of allowing convenient and clean erasure and/or correction of a written print.

SUMMARY OF THE INVENTION

According to one aspect of the present invention, a writing instrument containing, in its own container, a color ink agent mixing at least one electron donative coloring compound and one electron acceptive developing compound. The electron donative coloring compound is selected from a group A composed of crystal violet lactone (blue);
malachite green lactone (green);
1,3-dimethyl-6-diethylaminofluoran;
6-diethylamino-benzo[a]-fluoran (red);
3-cyclohexyl methylamino-6-methyl-7-anilinofluoran (black);
benzoyl leucomethylene blue (blue);
ethyl leucomethylene blue (blue);
methoxybenzoyl leucomethylene blue (blue);
2-(phenylimino ethanedilidene)-3,3-trimethyl-indoline (red);
1,3,3-trimethyl-indolino-7'-chloro-$\beta$-naphthospiropyran (purple);
di-$\beta$-naphthospiropyran (purple);
N-acetylauramine (yellow);
N-phenylauramine (yellow); and
rhodamine B lactam (red).

The electron acceptlye developing compound is selected from a group B consisting of zinc salicylate and bisphenol A.

An electron donative coloring compound selected from group A is developed from colorless state to a colored state specific to the particular coloring compound by coming into molecular contact with electron acceptive developing compound composed of zinc salicylate and bisphenol A. A color ink agent can be formed, therefore, by mixing them. Colors after development are shown in parentheses. The ink agent allows the effect of developing compound to be lost by application of water, and can be changed from a colored state to colorless state. In other words, the ink agent is achromatlzed merely by applying water, and a written print can be erased. In addition, the achromatlzed state is maintained even after it is dried, thus, a new print can be written on the achromatized portion with the writing instrument, and letters can be corrected, and modified in a convenient manner.

Also, in the writing instrument, because the ink agent itself is achromatized by water, a written print can be erased and/or corrected, even when it is written in a permeable surface, and writing and correction are enabled independently of a material of member to be written. Moreover, scribbles on clothes, walls, furnitures and the like as well as adhesions and dirt caused by misoperation can be easily achromatized, and cleaned. The written prints achromatized can be restored, for example, by applying the developing compound, and such new application is, therefore, enabled that confidential matters are recorded, and stored achromatically by making use of the achromaticity.

Besides, in the case of using the writing instrument as a whiteboard marker, in addition to the effect stated above, it is clean, because no dispersion of powdery pigments is caused, and prevents any squeezeout, unevenness and the like caused in a writing print, as the ink is smoothly sucked to a pen tip.

BRIEF DESCRIPTION OF THE DRAWINGS

An embodiment of the present invention will now be described, by way of example, referring to the attached diagrammatic drawings, in which.

DETAILED DESCRIPTION OF THE INVENTION

Figure 1:
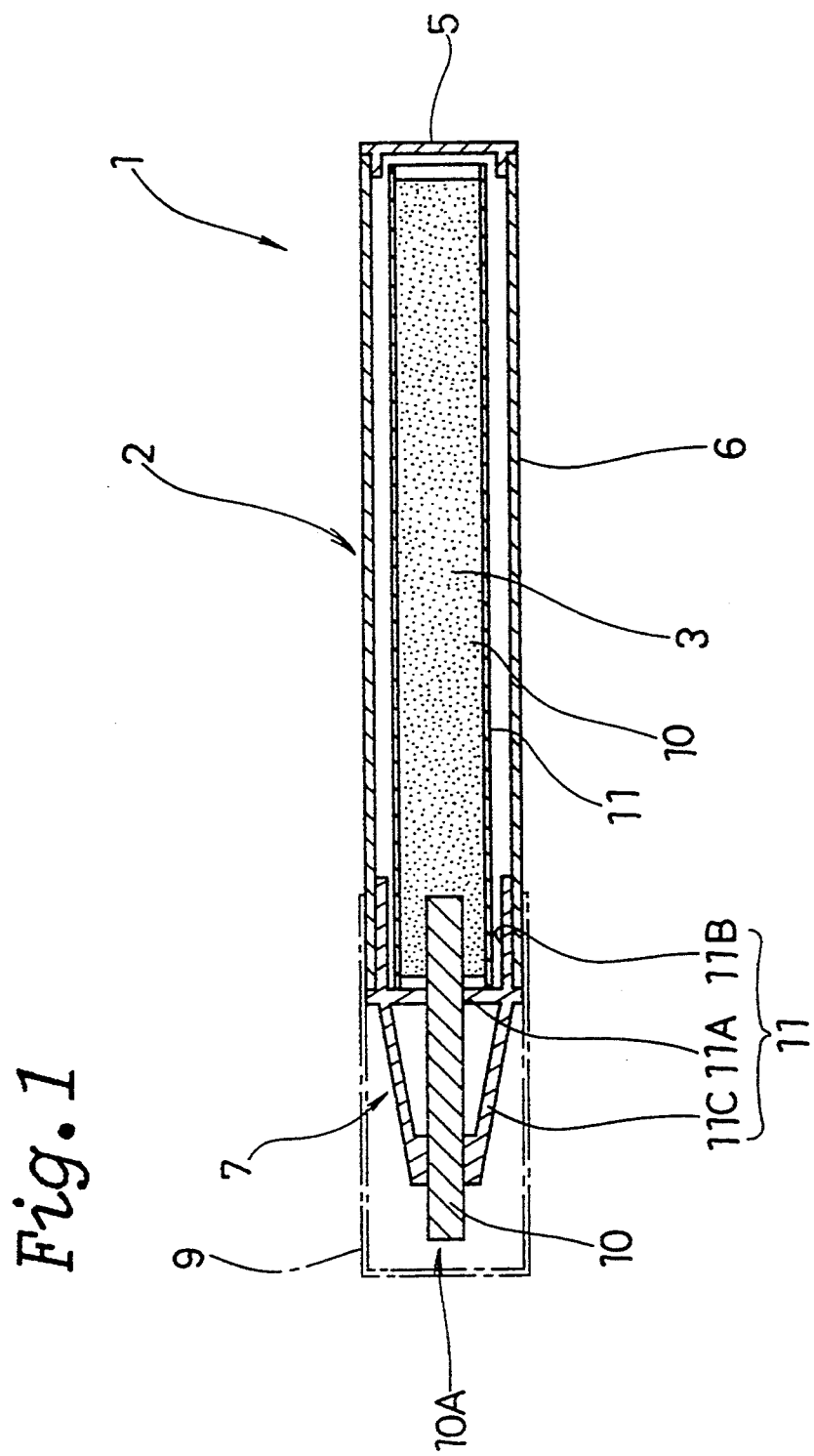
FIG. 1 is a sectional view showing an embodiment of the invention.

In FIG. 1, a writing instrument i is similar to a felt-tipped pen having a container 2 for containing a liquid color ink agent 3, and is used, for example, as a white-board marker, in the embodiment.

The container 2 comprises a cylindrical body 6 of a pen-like form with a rear end sealed by a bottom cover 5, a pen-tip member 7 fitted to a front end thereof and a cap piece 9 for covering the pen-tip member 7.

An impregnating member 10 like a cotton impregnated with the color ink agent 8 is coated by an inner cylinder 11, and set in the body 6.

The pen-tip member 7 comprises a core member 10 for directing the color ink agent 3 and a pen-tip holder piece 11 for holding the core member 10. The pen-tip holder piece 11 is integrally formed with a partition wall 11A for closing an opening in the front end of body 6, a flange 11B extended backward from a periphery of the partition wall 11A, and fitted to the body 6 and a holder part 11C formed conically so as to be extended in the forward direction from the partition wall 11A, and holding the core member 10 with its leading end projected. The core member 10 is for example, a felt consisting of a bundle of filaments, a rear end thereof is passed through the partition wall 11A so as to be in communication with the impregnating member 10 for drawing the color ink member 3 out by means of a capillary phenomenon or the like as well as directing the color ink agent 3 from the pen point 10A In the leading end thereof, and enables writing.

In the embodiment, the color ink agent 3 is a liquid with a low viscosity comprising an electron donative coloring compound and an electron acceptlye developing compound mixed in such anhydrous solvent as ethanol and alcohol.

As the electron donative coloring compound, those in a group A consisting of crystal violet lactone; malachite green lactone; 1,3-dimethyl-6-diethylaminofluoran; 6-diethylamino-benzo[a]-fluoran; 3-cyclohexyl methylamino-6-methyl-7-anilinofluoran; benzoyl leucomethylene blue; ethyl leucomethylene blue; methoxybenzoyl leucomethylene blue; 2-(phenylimino ethanedilidene)-3,3-trimethyl-indoline; 1,3,3-trimethyl-indolino-7'-chloro-β-naphthospiropyran; di-β-naphthospiropyran; N-acetylauramlne; N-phenylauramine; and rhodamine B lactam can be used. And one or more compounds selected from the group A are employed for the color ink agent 3.

As the electron acceptive developing compound, one selected from a group B consisting of zinc salicylate and bisphenol A is employed.

The structure of crystal violet lactone is as follows:

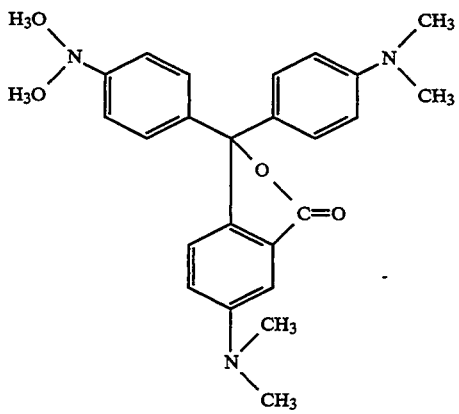

The structure of malachite green lactone is as follows:

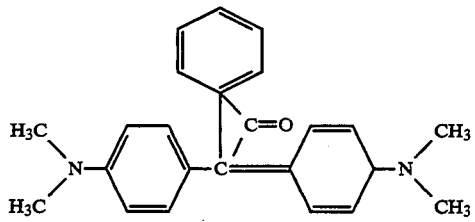

The structure of 1,3-dimethyl-6-diethylaminofluoran is as follows:

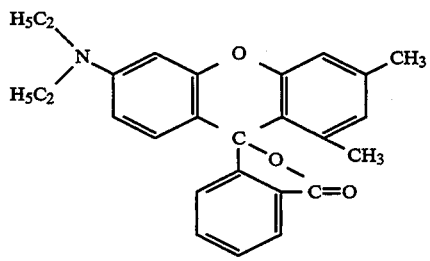

The structure of 6-diethylamino-benzo[a]-fluoran is as follows:

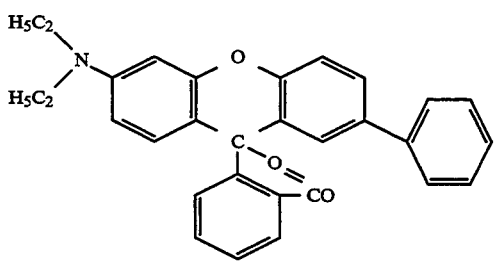

The structure of 3-cyclohexyl methylamino-6-methyl-7-anilinofluoran is as follows:

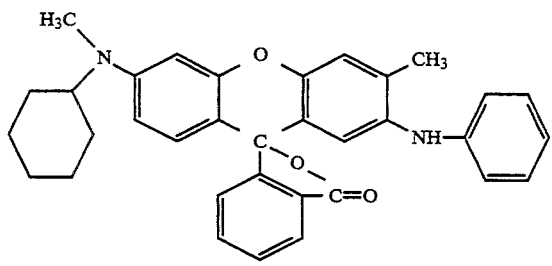

The structure of benzoyl leucomethylene blue is as follows:

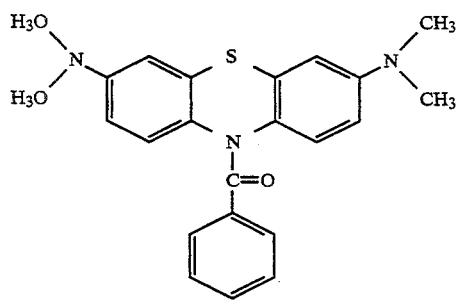

The structure of ethyl leucomethylene blue is as follows:

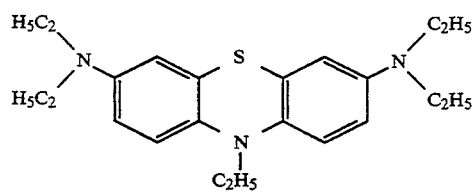

The structure of methoxybenzoyl leucomethylene blue is as follows:

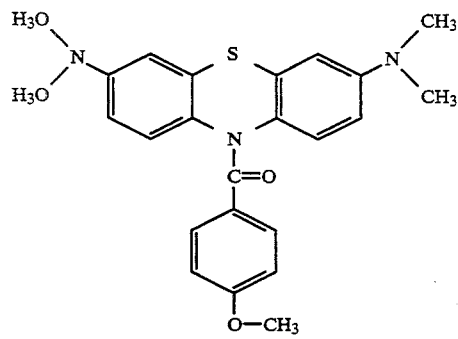

The structure of 2-(phenylimino ethanedilidene)-3,3-trimethyl-indoline is as follows:

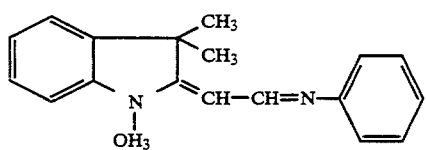

The structure of 1,3,3-trimethyl-indolino-7'-chloro-β-naphthospiropyran is as follows:

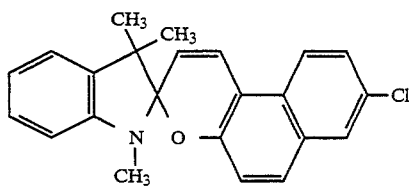

The structure of di-β-naphthospiropyran is as follows:

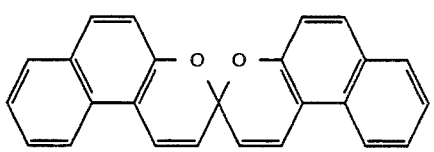

The structure of N-acetylauramine is as follows:

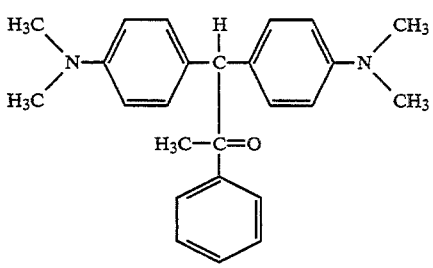

The structure of N-phenylauramine is as follows:

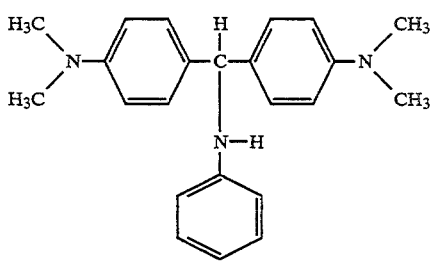

The structure of rhodamine B lactam is as follows:

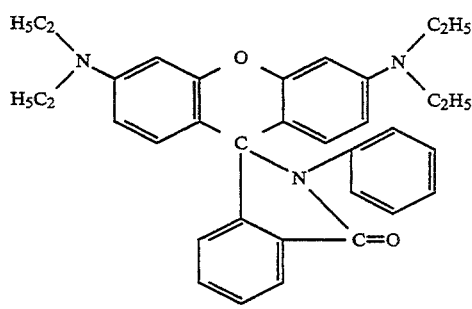

The structure of zinc salicylate is as follows:

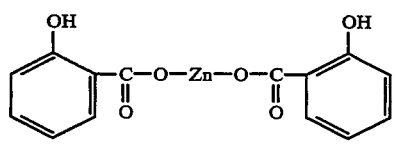

The structure of bisphenol A is as follows:

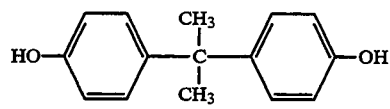

Then, when the electron donative coloring compound of group A is mixed with the electron acceptlye developing compound of group B, a color specific to the coloring compound is developed by a molecular contact with each other. When water is applied to the mixture, the water allows the developing compound to function as if it were lost, the coloration is immediately changed to colorless state, and the colorless (achromatized) state is maintained even after the water is dried up. Therefore, the achromatized area can be newly served for writing with the ink agent 3. In addition, because the achromaticity is caused by such function as if the developing compound in the ink agent 3 were lost, by newly applying an anhydrous solvent containing the developing compound after drying, a written print can be restored in colored state as it was before the achromatism.

Thus, since the writing instrument 1 using the ink agent 3 allows such achromatic operation by application of water, saliva and the like, a written print can be very easily erased and/or corrected, scribbles on clothes, walls and the like, dirt adhered by misoperation can be conveniently cleaned as well, and it can be conveniently operated.

Additionally, because no powdery substance is caused and dispersed during the achromatic operation, the circumferential environment can be maintained in a clean state, and suction by the core member 10 is smooth, thereby allowing writing without unevenness and squeezeout, as the compounds are liquidified such that they are completely solved in the solvent.

Moreover, the ink agent 3 allows the achromatic operation even when it is used on a permeable surface, and is, therefore applicable to various materials such as paper, cloth, wood and plastics in addition to a whiteboard marker and the like.

Furthermore, because the ink agent 3 is a liquid, the invention can be employed in such form of writing instruments as a brush pen, fountain pen and ball-point pen, alternatively to a felt-tipped pen.

(Example)

By mixing 5 parts by weight of 3-cyclohexyl methylamino-6-methyl-7-anilinofluoran, 2.5 parts by weight of 6-diethylaminobenzo-benzo[a]-fluoran, 2.5 parts by weight of crystal violet lactone and 5 parts by weight of bisphenol A in 60 parts by weight of dimethyl phthalate and 25 parts by weight of ethanol, and agitating them for about 20 minutes by using an agitator, a black color ink agent 3 was obtained. Then, it was confirmed that a letter written with the color ink is swiftly achromatized by applying water thereto, and such cycle of (writing)—(achromatic operation by water)—(drying)—(writing) can be repeated.

In addition, by agitating 3 parts by weight of zinc salicylate in 68 parts by weight of dimethyl phthalate and 29 parts by weight of ethanol, an anhydrous developing fluid was obtained. By applying the fluid to a print, which is written with the color ink agent 3 and achromatized by water, it was confirmed that the print was rapidly developed again in black color, and a cycle of (achromatic operation by water)—(drying)—(recoloration by developing fluid) can be repeated with the written print.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A writing instrument containing, in its own container, a color ink agent mixing at least one electron donative coloring compound selected from a group A consisting of
   crystal violet lactone;
   malachite green lactone;
   1,3-dimethyl-6-diethylaminofluoran;
   6-diethylamino-benzo[a]-fluoran;
   3-cyclohexyl methylamino-6-methyl-7-anilinofluoran;
   benzoyl leucomethylene blue;
   ethyl leucomethylene blue;
   methoxybenzoyl leucomethylene blue;
   2-(phenylimino ethanedilidene)-3,3-trimethyl-indoline;
   1,3,3-trimethyl-indolino-7'-chloro-β-naphthospiropyran;
   di-β-naphthospiropyran;
   N-acetylauramine;
   N-phenylauramine; and
   rhodamine B lactam, and
   an electron acceptive developing compound, the electron acceptive developing compound being zinc salicylate.

* * * * *